United States Patent [19]

Steudler, Jr.

[11] Patent Number: 4,543,912

[45] Date of Patent: Oct. 1, 1985

[54] WATERING SYSTEM FOR FOWL

[75] Inventor: Frederick W. Steudler, Jr., Providence, Pa.

[73] Assignee: Val Products, Inc., Bird-in-Hand, Pa.

[21] Appl. No.: 569,761

[22] Filed: Jan. 10, 1984

[51] Int. Cl.⁴ .............................................. A01K 39/02
[52] U.S. Cl. ........................................ 119/18; 119/72; 285/61
[58] Field of Search ..................... 119/18, 72, 72.5, 75; 285/61, DIG. 16, 417, 423, 5; 403/305, 300

[56] References Cited

U.S. PATENT DOCUMENTS

| | | | |
|---|---|---|---|
| 2,672,356 | 3/1954 | Crocket | 285/61 |
| 2,735,699 | 2/1956 | Chadbourne | 285/61 |
| 2,757,023 | 7/1956 | Hein | 285/61 |
| 2,769,647 | 11/1956 | Harstick et al. | 285/61 |
| 3,664,305 | 5/1972 | Hart et al. | 119/72 |
| 3,730,228 | 5/1973 | Gibbs, Sr. | 285/61 |
| 3,964,440 | 6/1976 | Hart | 119/18 |
| 4,022,500 | 5/1977 | van den Beld | 285/DIG. 16 |

FOREIGN PATENT DOCUMENTS 1596005 7/1970 France ...................... 285/DIG. 16

Primary Examiner—Jay N. Eskovitz
Attorney, Agent, or Firm—Diller, Ramik & Wight

[57] ABSTRACT

This disclosure is directed to a watering system for fowl, such as chickens, ducks or the like, as well as other small animals, which is specifically adapted for use with cages, the system includes a plurality of pipes, each pipe having a plurality of aligned valved dispensing nozzles, and a coupling providing fluid communication between adjacent aligned pipes, each coupling having a uniplanar locating surface preferably in the form of terminal end faces of a pair of parallel disposed legs, and an adhesive or the equivalent securing each coupling to its associated pipe with a plane through the terminal faces of the legs being normal to the axes of the valved dispensing nozzles whereby when the end faces of the legs of each coupling are placed upon a reference surface, such as top horizontally disposed wires of a cage, the valved dispensing nozzles are normal to the horizontal, and thus operate in a repetitively efficient manner in the absence of malfunctioning which might otherwise occur if such nozzles were inclined to the horizontal.

10 Claims, 8 Drawing Figures

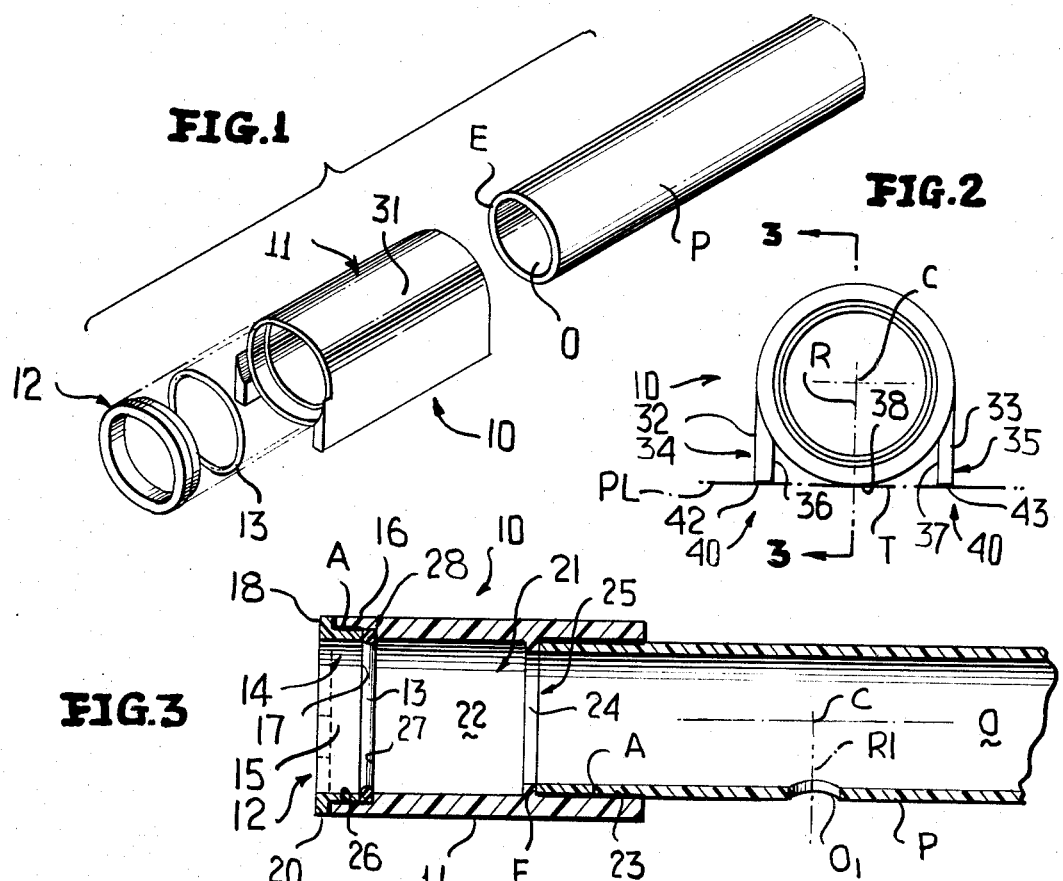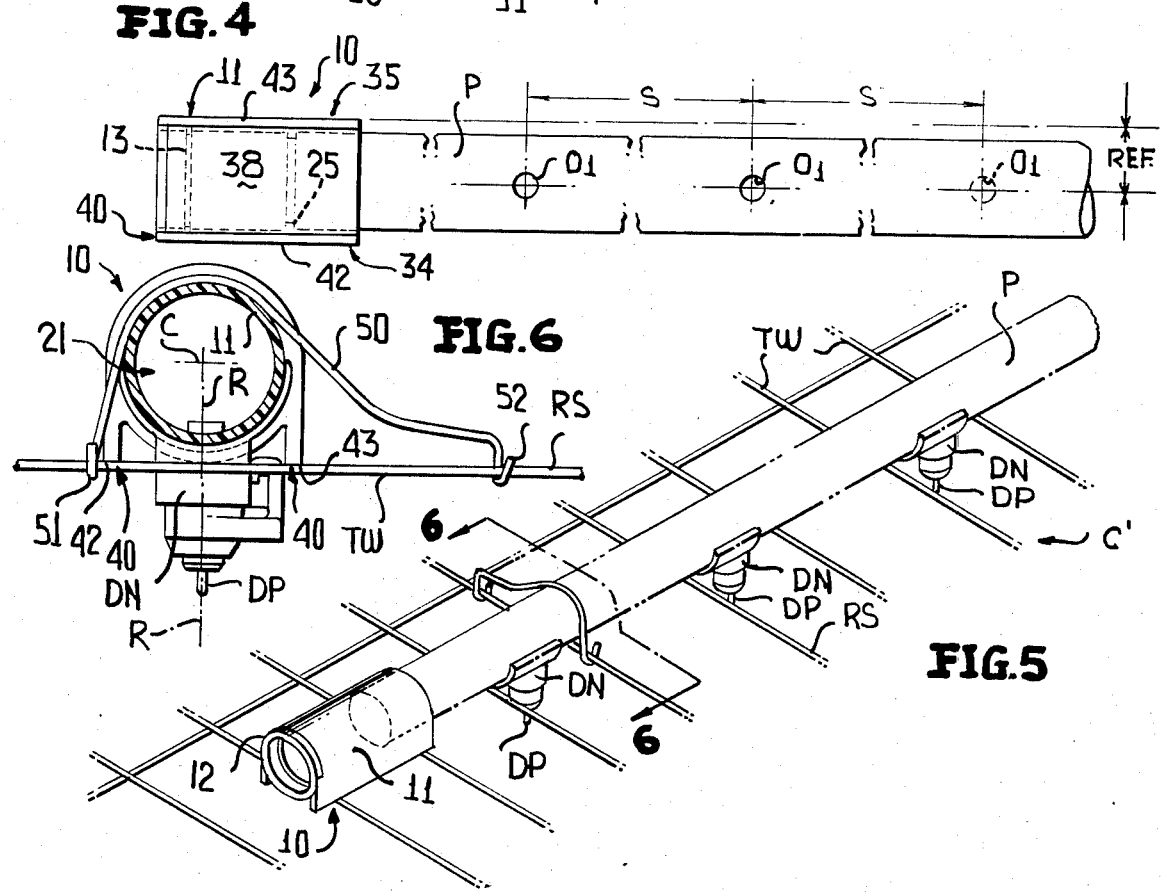

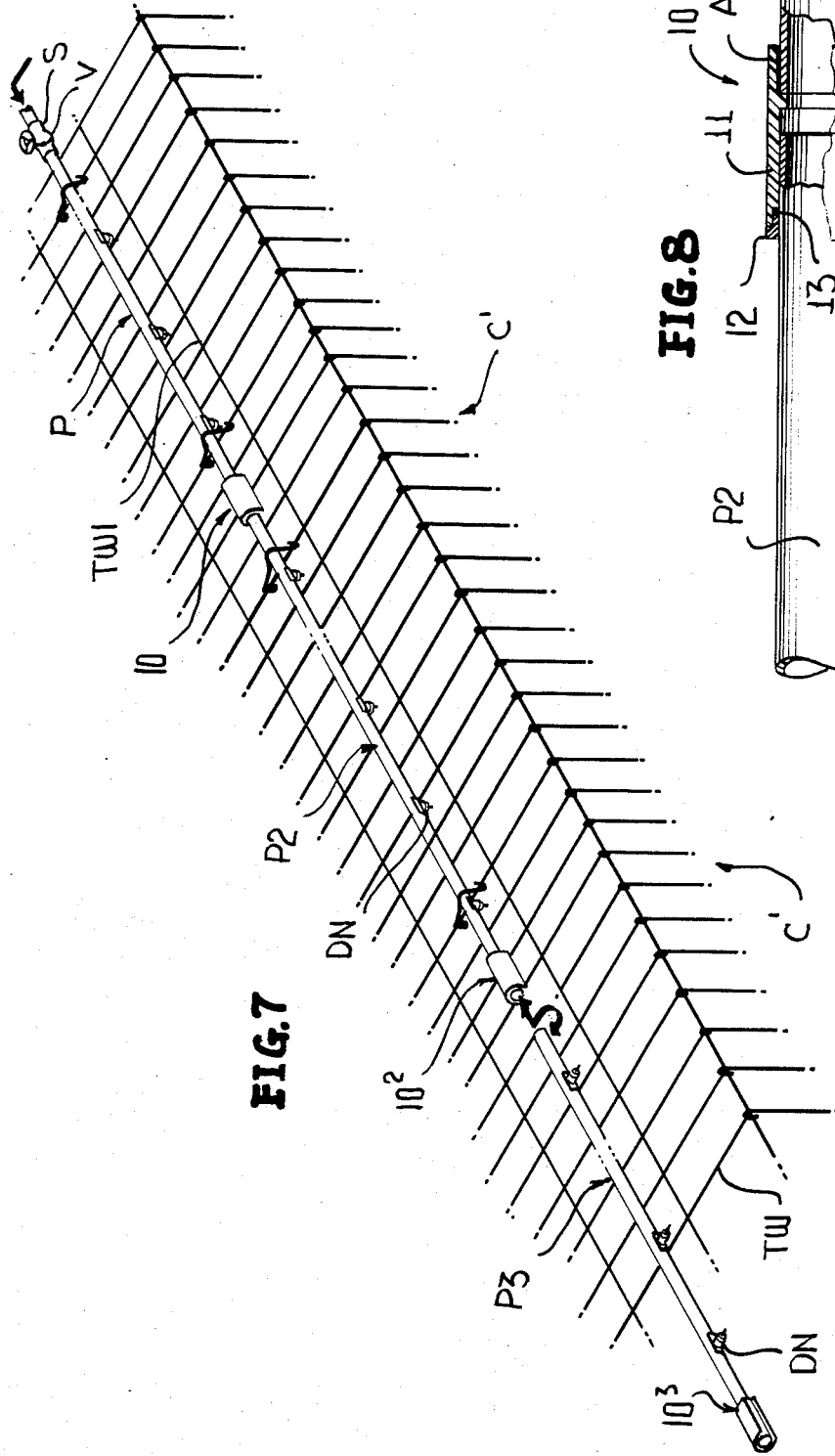
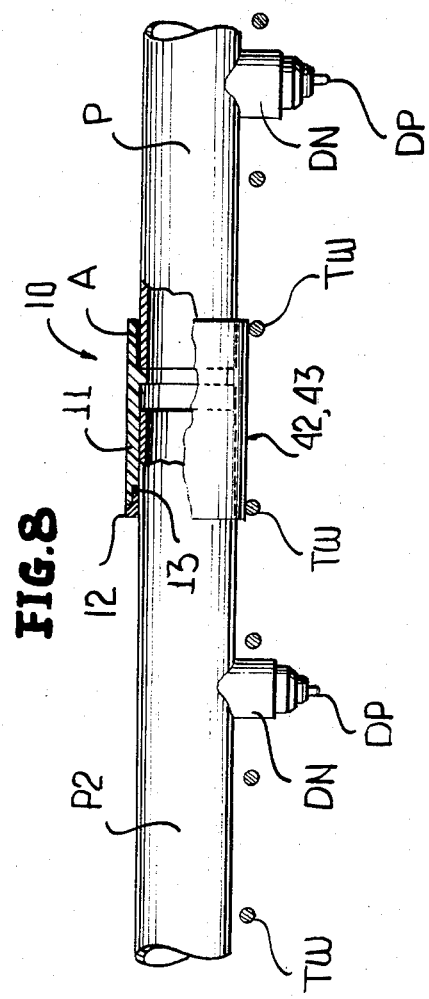

WATERING SYSTEM FOR FOWL

There are numerous watering systems for chickens, ducks or similar animals, and typical examples thereof are disclosed in patents to Harold W. Hart et al, Mirella Floretto and Eldon Hostetler which issued respectively on May 23, 1972; Aug. 31, 1971; and Aug. 18, 1981 under respective U.S. Pat. Nos. 3,664,305; 3,602,197; and 4,284,036. A common feature of these watering systems includes the provision of a main distribution pipe which is connected to a suitable source of water and from which depends a plurality of valved dispensing nozzles. The valved dispensing nozzles must be preferably normal to the horizontal so that the valves can properly unseat and seat when operated by the fowl. If the nozzles are not normal to the horizontal, the valves may not seat properly relative to their valve seats, leakage occurs, and if this continues not only is considerable water wasted but, more importantly, spillage combined with excrement is unsanitary, odoriferous, and creates difficulties in both clean-up and disposal.

Little difficulty is encountered in connecting a single dispensing nozzle to a pipe or, for that matter, a plurality of dispensing nozzles to a pipe with the axes of the nozzles normal to the axis of the pipe. However, even when the latter is accomplished, there is no accurate way of assuring that even a perfectly fabricated and aligned pipe and dispensing nozzles will be located relative to the fowl or animal cages such that the axes of the valve dispensing nozzles are, in fact, normal to the horizontal to achieve the repetitive and proper operation of the valves. This problem is highlighted when two such pipes with valve dispensing nozzles are connected to each other or to other such pipes which might, for example, run the entire length of a poultry house. Furthermore, though it is, obviously, impossible to achieve the perfect vertical alignment to the horizontal latter-noted in most systems, such can not now be done in an extremely rapid and simple matter.

In keeping with the foregoing, it is a primary object of this invention to provide a novel poultry or like watering system which in its most basic form includes a pipe defining a first through opening through which water is adapted to flow along a first path of travel, a second opening in the pipe for diverting the water flow from the first path of travel to a second path of travel at a predetermined angle to the first path of travel, the second path of travel including a valve dispensing nozzle therein, and a coupling connected to the pipe having means for defining a uniplanar locating surface exterior of the pipe at a point along the first path of travel which is normal to a reference line defined by the valve dispensing nozzle axis which is also normal to a line tangent to the first opening whereby upon orienting the pipe such that the uniplanar locating surface rests on a horizontal reference surface, such as the upper wires of a poultry cage, the nozzle axis is likewise automatically oriented normal to the horizontal thus permitting one or more of such pipes and couplings to be rapidly and accurately positioned atop cages as desired with the assurance that all of the valved dispensing nozzles will be oriented for optimum functioning.

Still another object of this invention is to provide a novel poultry watering system as latter defined wherein the uniplanar locating surface of the coupling is defined by a pair of exterior flat coplanar end faces of parallel legs of the coupling which are also parallel to the axis of the through opening.

Still another object of this invention is to provide a novel poultry watering system or distribution system as aforesaid wherein each coupling is adhesively secured to an associated pipe and adjacent aligned pipes are simply slipped fit together by means of a gasket which allows each succeeding pipe in a line to be rapidly connected, disconnected, and oriented when connected.

A further object of this invention is to provide a novel poultry watering system as aforesaid wherein means preferably in the form of spring clips are used to hold the pipes to the upper wires of an associated cage to maintain the desired vertical orientation of the valved dispensing nozzles.

Still another object of this invention is to provide a novel coupling per se separate and apart from an associated pipe and its valved dispensing nozzles.

Another object of this invention is to provide a novel method of assembling a pipe, a plurality of valved dispensing nozzles and a coupling of the type latter described such that upon the assembly of one such unit, the latter and any number of identical units can be rapidly assembled in line with automatically orientation of the valved dispensing nozzles vertical to a horizontal plane, namely, to a plane passing through the top wires of associated cages.

With the above and other objects in view that will hereinafter appear, the nature of the invention will be more clearly understood by reference to the following detailed description, the appended claims and the several views illustrated in the accompanying drawings.

IN THE DRAWINGS:

FIG. 1 is an exploded perspective view of a coupling of the present invention, and illustrates the manner in which an O-ring gasket is introduced into the coupling and the sleeve for securing the same therein.

FIG. 2 is an end elevational view of the coupling of FIG. 1, and illustrates a pair of depending parallel legs having terminal end faces defining a uniplanar locating surface.

FIG. 3 is a cross-sectional view taken generally along line 3—3 of FIG. 3, and illustrates the manner in which the gasket is retained in the coupling by the sleeve and an end of the pipe is bonded to the coupling at a predetermined position established by an internal annular locating flange.

FIG. 4 is a bottom plan view of the coupling, and illustrates a plurality of openings formed in the pipe whose axes are normal to a plane through the end faces of the legs.

FIG. 5 is a perspective view of the pipe and coupling of FIG. 4 after a plurality of valved dispensing nozzles have been attached to the pipe, and illustrates the manner in which the uniplanar locating surface of the feet of the coupling when positioned atop horizontally disposed top wires of a poultry cage automatically align the axes of the nozzles in a plane normal to the horizontal.

FIG. 6 is an enlarged sectional view taken generally along line 6—6 and illustrates the vertical dispositions of the nozzles relative to a horizontal plane through the feet of the coupling.

FIG. 7 is a perspective view of a plurality of cages and several of the units of FIGS. 3 and 4 assembled in alignment with each being accurately located by the locating surfaces of the associated coupling.

FIG. 8 is a side elevational view with a portion thereof broken away for clarity and shown in cross-section, and illustrates the manner in which one pipe is friction fit in a coupling to which another pipe is adhesively bonded.

A novel coupling constructed in accordance with this invention is fully illustrated in FIGS. 1, 2 and 3 of the drawings, and is generally designated by the reference numeral 10.

The coupling 10 is formed of injection molded polymeric or copolymeric plastic material (A.D.S.) and is formed of a main body 11 and a sleeve 12. A separate O-ring seal or gasket 13 is assembled between the sleeve 12 and the body 11 in the manner readily apparent in FIG. 3.

The sleeve 12 includes a cylindrical wall 14 having an interior cylindrical surface 15, an exterior cylindrical surface 16 and a peripherial end face 17. A radially outwardly directed flange 18 has an exterior cylindrical surface 20.

The main body 11 of the coupling 10 includes a through opening generally designated by the reference numeral 21 (FIG. 3) which is defined by two axial aligned bores 22, 23 and a counterbore 24 therebetween which in part defines an internal locating or abutting flange or rib 25 against which seats or abuts an end face E of a conventional water pipe or conduit P constructed of polymeric or copolymeric plastic material (A.D.S.) and, of course, having the usual through opening O therethrough. The opening 21 is counterbored to the left of the bore 22 to define an interior cylindrical wall 26, a peripheral wall 27, and the latter collectively defines with the end face 17 of the sleeve 12 an inwardly opening peripheral groove or channel 28 within which is seated the gasket 13. As is most apparent from FIG. 1, the gasket 13 is simply slid into the body 11 along the cylindrical surface 26 until it rests against the peripheral surface 27 (FIG. 3) after which a conventional adhesive A is applied to the cylindrical surface 16 of the flange 18 of the sleeve 12, and the latter is inserted in the body 11 to the position shown in FIG. 3 thus seating or locating and confining the gasket 13 within the groove 28.

The main body 11 also includes a generally semi-cylindrical upper exterior surface 31 which blends with two generally parallel side surfaces 32, 33 which in part define respective legs 34, 35, each of which includes an inboard surface 36, 37, respectively. The inboard surfaces 36, 37 are bridged by a lower semi-circular or semi-cylindrical exterior surface 38.

The coupling 10 further includes means 40 for defining a uniplanar locating surface normal to a reference line R passing through the axis or center C of the opening 21 which is also normal to a line T which is tangent to the surface 38 and the opening 21. The uniplanar locating surface is defined by a pair of spaced, coplanar, flat, exterior, elongated end faces 42, 43 of the respective legs 32, 33. The plane through the faces 42, 43 is generally designated by the reference character PL which is the same as the tangent line T passing through the surface 38 normal to the reference line R. As is most apparent from FIG. 2, if the coupling 10 is placed upon a horizontal reference surface with the end faces 42, 43 in contact therewith, the reference line R will be normal to such reference surface and, in keeping with this invention, such reference surface RS (FIG. 5, 6 and 7) is defined by a plane passing through horizontally positioned top wires TW of anyone of a series of cages C' within which are housed poultry, fowl or like small animals which are to be watered in keeping with the overall aspects of this invention.

The pipe P, prior to being assembled to the coupling 10 or after being assembled thereto, is provided with a plurality of openings O1 (FIG. 4) whose axes are in alignment with each other. The axis of each opening O1 also passes through the axis or center C of the opening O of the pipe P. One such reference line or lines R1 is shown in FIG. 3 associated with the opening O1 thereof, and the reference line R1 is shown not only passing through the axis of the opening O1, but also passes through the center or axis C of the opening 21. Thus, a plane through all of the reference lines R1 of the opening O1 is common to the center or axis C of the opening O of the pipe P.

After the openings O1 have been formed in the pipe P, a conventional valved dispensing nozzle DN is adhesively bonded to the pipe P (FIGS. 5, 6 and 8). The dispensing nozzles DN are of a conventional construction and may be, for example, identical to those disclosed in U.S. Pat. No. 4,284,036 heretofore noted. Each such dispensing nozzle DN includes a valve seat, a ball valve or similar valve element, and a depending pin DP which can be moved by a chicken or the like to actuate the valve element and, thus, dispense water through the associated dispensing nozzle DN. The axis of each dispensing nozzle DN, the dispensing pin DP thereof and, of course, the flow path therethrough are all normal to the axis C of the pipe P and, thus, the reference line R1 is not only the center of the associated openings O1 but is also the axis of each associated dispensing nozzle DN and dispensing pin DP, as is best illustrated in FIGS. 6 and 8.

The pipe P with the dispensing nozzles DN secured thereto may now be inserted into the coupling 10 in the manner shown in FIG. 3, with, of course, adhesive A having been applied prior to such insertion. The pipe P is introduced into the opening 21 along the interior surface 23 until the pipe end E abuts the wall 25, as was heretofore described. However, most importantly, the pipe P is so oriented relative to the coupling 10 so that the reference line R1 is in the same plane as the reference line R which, of course, means that a plane through all of the reference lines R1 is also normal to the plane PL of the uniplanar locating surfaces 42, 43. When the pipe P has been thus bonded by the adhesive A to the coupling 10, it can be positioned, along with other such identically constructed pipes and/or associated couplings, upon the top wires TW of one or more cages C' in the manner best illustrated in FIGS. 5 through 8 of the drawings to which attention is now specifically directed.

In FIG. 7, a conventional water source is connected to a spigot S which can be opened and closed by a manual valve V. the spigot S can simply be provided with a gasket, such as the gasket 13, or it may be constructed from conventional plastic material (A.D.S.) into which the pipe P can be inserted and adhesively bonded. In either case, prior to such securement or adhesive bonding, the pipe P is simply inserted into the socket S and the faces 42, 43 of the respective feet 34, 35 are positioned upon one or more of the top wires TW of the cages C' which wires TW are, of course, positioned in a horizontal plane. Thus, the plane PL of the coupling 11 lies in and is the same as the reference surface or reference plane RS defined by the plane passing through the top wires TW of the cages C'. Therefore, due to the normal relationship of the plane PL and the reference lines RL of each of the dispensing nozzles DN, all of the reference lines R1 and thus all of the dispensing nozzles DN are in a perfect vertical plane or a plane normal to the horizontal and by virtue of the latter the dispensing pins DP can be operated by fowl in a repetitive manner with assurance of complete valve seating at the end of each dispensing operation. Suitable clips, such as the spring clip 50 having looped ends 51, 52, are utilized to hold the pipe P in the position just described.

Obviously, if the length of cages C' are relatively substantial, additional pipes or pipe units may thereinafter be identically oriented atop the cages upon the top wires TW and united to the preceding units. Once again, in FIG. 7 another pipe P2 and its associated coupling $10^2$ are shown with the end of the pipe P2 inserted in the coupling 10 with, of course, the orientation of the nozzles DN again being perfectly normal to the reference surface RS due to the coupling $10^2$ being disposed with its associated plane PL lying in the reference plane RS. Similarly, another pipe P3 and its coupling $10^3$ can be likewise assembled to the coupling $10^2$, and in FIG. 7 this is shown clearly by the double-headed arrow indicating that the coupling action takes place first by an axial insertion of the pipe P3 into the coupling $10^2$ and then a rotation of the pipe P3 until the nozzles DN are again in a vertical plane by virtue of the end faces 42, 43 of the coupling $10^3$ resting once again upon the top wires TW of the associated cage. Obviously, the last of the couplings in this series can simply be closed by an appropriate plug (not shown) so that water from the spigot S upon the opening of the valve V can flow outwardly only through those dispensing nozzles DN which have been actuated through their dispensing pins DP.

It is to be particularly noted that in order to assemble the various pipes P, P2, P3, etc., it is only necessary to insert the ends of the pipes P2, P3 into the respective couplings 10, $10^2$, etc., in the absence of any type of positive coupling simply because the clips 50 hold the units thus coupled and the gaskets 13 effectively preclude leakage between each pipe and its associated coupling. Just as importantly, due to the fact that each particular pipe/coupling P, 10; P2, $10^2$; and P3, $10^3$ are preassembled as heretofore described in units of varying lengths (6 feet, 8 feet, 10 feet, etc.), units of any desired length can be rapidly assembled and disassembled as need be in the absence of any type of sophisticated connections, separate connecting elements between pipes and couplings, and, most importantly, without any auxiliary aides to assure that the axes or reference lines R1 of each of the dispensing nozzles DN lies in a perfectly vertical plane.

While one method of assembling the pipe units or pipes P, P2 to the couplings 10, $10^2$, etc., has been described, variations therein are equally apparent and are within the scope of the present invention. For example, if it were either impossible or impractical to mount the units P, P2, etc., upon the top wires TW of cages C' and instead it was desired to secure the same along side wires SW (FIG. 7), the only modification required would be that of instead of connecting the dispensing nozzles DN to the openings O1 with the dispensing pins DP normal thereto, it would be necessary to provide a 90 degree bend by an appropriate 90 degree elbow between each dispensing nozzle DN and its associated opening O1. This would position the axis of each dispensing pin DP in a plane parallel to the plane PL of the terminal faces 42, 43. Thus, as the feet 42, 43 are held against the side wires SW of the cages C', the water exiting the through opening O would pass horizontally into one of the openings O1, one horizontal arm (not shown) of such 90 degree elbow, and thereafter downwardly in the other vertical arm of the 90 degree elbow to and through the dispensing nozzle DN.

While the invention has been described relative to a coupling 10 which simply has a linear or unidirectional opening therethrough, it is equally applicable to couplings which are T-shaped, L-shaped, Y-shaped, perfect crosses, etc. For example, referring once again to FIG. 7, it is clearing apparent that the coupling 10 could have a leg disposed normal thereto in fluid communication with the opening 21 and, of course, with a like means for definig uniplanar locating surface corresponding to the surfaces 42, 43 which could rest upon an adjacent longitudinal top wire TW1. This would permit water flowing through the pipe P and the coupling 10 to then flow from the latter at a 90 degree angle to feed yet another series of pipes and couplings at other cages adjacent the cages C'. Obviously, if two such arms were utilized with the coupling 10 from opposite sides thereof and both were connected to similar units parallel to those shown in FIG. 7 further dispensing nozzles could be supplied water from the single spigot S. As noted earlier, such variations are apparent, as are others, and all are considered within the scope of the present invention.

Insofar as the coupling 10 is concerned, though the same has been described heretofore as having feet 34, 35 such separate feet are not necessarily required and the area between the cylindrical surface 38 and the inside surfaces 36, 37 could simply be solid which in effect would form the body 11 as having a single flat broad bottom surface in lieu of the two surfaces 42, 43. Thus, whether one or more surfaces are utilized is immaterial so long as there is established a plane PL having the characteristics heretofore defined relative to the reference lines R1.

Although only a preferred embodiment of the invention has been specifically illustrated and described herein, it is to be understood that minor variations may be made in the apparatus without departing from the spirit and scope of the invention, as defined in the appended claims.

What is claimed is:

1. A fluid flow orientation system comprising a pipe having axially opposite end portions and a passage therethrough through which fluid is adapted to flow along a first path of travel, at least one opening in said pipe having an axis disposed in transverse relationship to said passage for diverting the fluid flow from said first path of travel to a second path of travel at a predtermined angle to said first path of travel, a coupling, means fixing said coupling to one of said pipe end portions and said coupling having means for defining a uniplanar locating surface exteriorly of said coupling at a point said first path of travel which is normal to a reference line passing through said one opening axis and normal to a line tangent to the opening whereby upon orienting said coupling such that said uniplanar locating surface rests upon a reference surface, said second path of travel is likewise automatically oriented in a plane at a desired angle to the reference surface established by the fixed relationship of said coupling and said one pipe end portion.

2. The fluid flow orientation system as defined in claim 1 wherein said uniplanar locating surface is defined by an exterior surface of said coupling.

3. The fluid flow orientation system as defined in claim 1 wherein said uniplanar locating surface is defined by a pair of spaced coplanar surfaces.

4. The fluid flow orientation system as defined in claim 1 wherein said uniplanar locating surface is flat.

5. The fluid flow orientation system as defined in claim 1 wherein said uniplanar locating surface is a pair of exterior flat coplanar surface portions.

6. The fluid flow orientation system as defined in claim 1 wherein said uniplanar locating surface is defined by terminal end faces of a pair of legs of said coupling.

7. The fluid orientation system as defined in claim 1 wherein said uniplanar locating surface is defined by terminal end faces of a pair of legs of said coupling which are disposed generally parallel to said first path of travel.

8. The fluid flow orientation system as defined in claim 1 including an axial bore in said coupling, and means within said axial bore for abuttingly contacting an end face of said one pipe end portion.

9. The fluid flow orientation system as defined in claim 1 including an axial bore in said coupling, means within said axial bore for abuttingly contacting an end face of said one pipe end portion, and said fixing means is adhesive.

10. The fluid flow orientation system as defined in claim 1 wherein said fixing means is adhesive.

* * * * *